US011897111B2

(12) United States Patent
Nakane et al.

(10) Patent No.: US 11,897,111 B2
(45) Date of Patent: Feb. 13, 2024

(54) POWER TOOL

(71) Applicant: MAKITA CORPORATION, Anjo (JP)

(72) Inventors: Yasumasa Nakane, Anjo (JP); Luyen Van Tong, Anjo (JP)

(73) Assignee: MAKITA CORPORATION, Anjo (JP)

( * ) Notice: Subject to any disclaimer, the term of this patent is extended or adjusted under 35 U.S.C. 154(b) by 26 days.

(21) Appl. No.: 17/740,503

(22) Filed: May 10, 2022

(65) Prior Publication Data

US 2022/0379452 A1 Dec. 1, 2022

(30) Foreign Application Priority Data

May 28, 2021 (JP) ................................ 2021-089801

(51) Int. Cl.

*B25F 5/00* (2006.01)
*B24B 23/04* (2006.01)
*B26B 7/00* (2006.01)
*B25F 1/02* (2006.01)
*B25F 3/00* (2006.01)
*B25F 5/02* (2006.01)

(52) U.S. Cl.

CPC .............. *B25F 5/001* (2013.01); *B24B 23/04* (2013.01); *B25F 1/02* (2013.01); *B25F 3/00* (2013.01); *B25F 5/02* (2013.01); *B26B 7/00* (2013.01)

(58) Field of Classification Search

CPC ............. F16F 15/28; B25F 1/00; B24B 23/04
See application file for complete search history.

(56) References Cited

U.S. PATENT DOCUMENTS

2017/0136599 A1 5/2017 Aoki

FOREIGN PATENT DOCUMENTS

JP 2015-229223 A 12/2015

*Primary Examiner* — Daniel Jeremy Leeds
(74) *Attorney, Agent, or Firm* — Oliff PLC

(57) ABSTRACT

A power tool has a motor having a rotary shaft, an eccentric shaft configured to be rotated around a rotation center axis of the rotary shaft, and a balancer configured to rotate with the rotary shaft. When viewed along the rotation center axis, (1) a first imaginary line passes the rotation center axis and an eccentric axis, (2) an imaginary perpendicular line crosses perpendicularly to the first imaginary line and passes the rotation center axis, (3) a center of gravity of the balancer is located in a region on a side opposite to the eccentric axis across the imaginary perpendicular line; and (4) a second imaginary line passes the rotation center axis and the center of gravity of the balancer and (5) the second imaginary is inclined at an inclination angle larger than 0° and smaller than 90° in a direction opposite to a rotating direction of the rotary shaft.

19 Claims, 11 Drawing Sheets

POWER TOOL

CROSS-REFERENCE TO RELATED APPLICATIONS

The present application claims priority to Japanese patent application No. 2021-89801 filed on May 28, 2021, the contents of which are hereby fully incorporated herein by reference.

TECHNICAL FIELD

The present disclosure relates to a power tool.

BACKGROUND

Known power tools are configured to process a workpiece by driving a tool accessory in an oscillating manner by a motor. For example, JP2015-229223A discloses a power tool configured to oscillate a tool accessory by eccentrically rotating an eccentric shaft. The eccentric shaft is eccentrically connected to an output shaft of a motor, around the output shaft of the motor. In this power tool, a balancer is mounted onto the output shaft of the motor as a weight for adjusting the position of the center of gravity in order to reduce vibration that is caused in the power tool during operation by a centrifugal force generated by eccentric rotation of the eccentric shaft.

SUMMARY

Inventors of the present disclosure, however, have found that when the oscillating tool accessory gets into contact with a workpiece, even if a balancer is provided like in JP2015-229223A, vibration of the power tool may be increased by resistance that is generated between the workpiece and the tool accessory and acts in a direction to inhibit oscillation of the tool accessory. Therefore, in such a power tool that drives a tool accessory in an oscillating manner, there is still room for further improvement in the technology that inhibits vibration that is caused in the power tool during processing of a workpiece.

According to one aspect of the present disclosure, a power tool is provided which processes a workpiece by driving a tool accessory in an oscillating manner. The power tool of this aspect includes a motor, an eccentric shaft, a motion converting mechanism and a balancer. The motor has a rotary shaft that is rotationally driven in one direction. The eccentric shaft extends from one end of the rotary shaft. The eccentric shaft is configured to be rotated around a rotation center axis of the rotary shaft, at a position that is eccentric from the rotation center axis of the rotary shaft in a radial direction orthogonal to the rotation center axis, by rotation of the rotary shaft. The motion converting mechanism is configured to connect the tool accessory and the eccentric shaft and convert one revolution of the eccentric shaft to one reciprocating oscillation of the tool accessory. The balancer is mounted onto an outer periphery of the rotary shaft and configured to rotate together with the rotary shaft. When viewed along the rotation center axis, (1) a first imaginary line passes the rotation center axis and an eccentric axis, which is a center axis of the eccentric shaft, (2) an imaginary perpendicular line crosses perpendicularly to the first imaginary line and passes the rotation center axis, and (3) a center of gravity of the balancer is located in a region on a side opposite to the eccentric axis across the imaginary perpendicular line. When viewed along the rotation center axis, (4)

a second imaginary line passes the rotation center axis and the center of gravity of the balancer, and (5) the second imaginary line is inclined at an inclination angle larger than 0° and smaller than 900 in a direction opposite to a rotating direction of the rotary shaft relative to the first imaginary line.

According to the power tool of this aspect, a centrifugal force is generated by rotation of the balancer in such a direction that the centrifugal force serves to cancel resistance generated by contact between the oscillating tool accessory and the workpiece, at the timing of increase of the resistance. Therefore, vibration of the power tool can be inhibited from being increased due to the resistance between the tool accessory and the workpiece during processing of the workpiece.

DETAILED DESCRIPTION OF THE EMBODIMENTS

Figure 1:
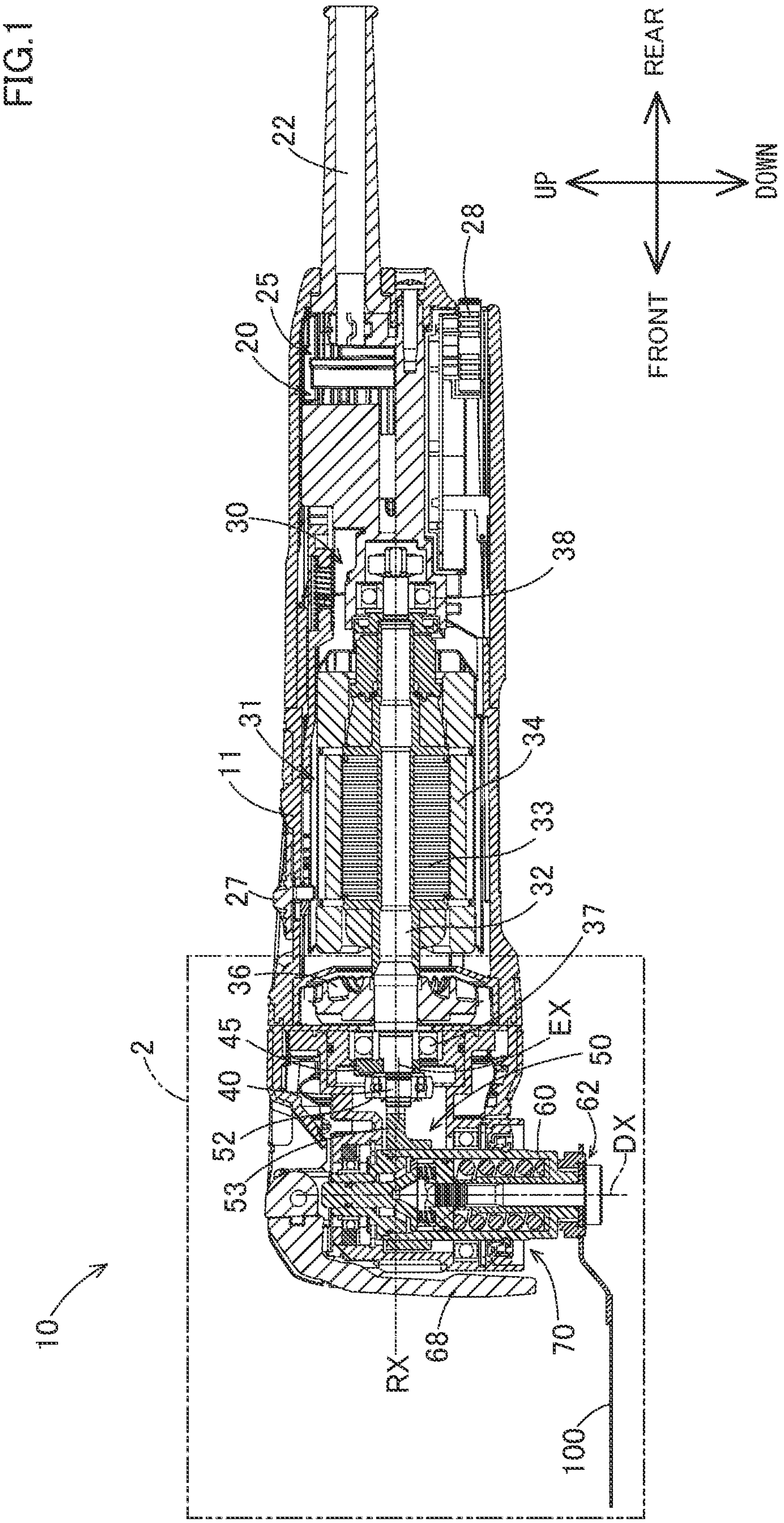
FIG. 1 is a sectional view of a power tool in a cutting plane that contains a rotation center axis RX and a driving axis DX.

In one non-limiting embodiment according to the present disclosure, the balancer of the power tool may have an asymmetrical shape to the first imaginary line when viewed along the rotation center axis. In the power tool having this structure, the center of gravity of the balancer can be more easily set at a position where the second imaginary line is inclined relative to the first imaginary line.

In addition or in the alternative to the preceding embodiment, the balancer may have a base through which the rotary shaft is inserted in a thickness direction of the base, and a projection protruding from a side face of the base in a direction parallel to the rotation center axis. In the power tool having this structure, the weight of the balancer is increased by the weight of the projection, so that the centrifugal force that serves to cancel the resistance between the tool accessory and the workpiece can be further increased. Therefore, vibration of the power tool is more effectively inhibited from being increased due to the resistance between the tool accessory and the workpiece during processing of the workpiece. In the power tool having this structure, the weight of the balancer is increased by providing the projection without need for increasing the size of the balancer in the radial direction. Further, in the power tool having this structure, a space facing the side face of the base of the balancer can be effectively utilized to accommodate the projection and thus inhibited from becoming a dead space within the power tool.

In addition or in the alternative to the preceding embodiments, the projection may be provided on an outer edge part that is farthest from the rotation center axis in the radial direction in the base, or in a position closer to the outer edge part than to the rotation center axis in the radial direction. In the power tool having this structure, the center of gravity of the balancer can be easily set at a position far from the rotation center axis, so that the centrifugal force generated by rotation of the balancer can be more easily increased. Therefore, vibration of the power tool is more effectively inhibited from being increased during processing of the workpiece.

In addition or in the alternative to the preceding embodiments, the inclination angle of the second imaginary line relative to the first imaginary line may be larger than 10° and smaller than 60°. In the power tool having this structure, the timing of increase of the resistance generated between the tool accessory and the workpiece can be made closer to the timing of increase of the centrifugal force generated in the direction to cancel the resistance by rotation of the balancer. Therefore, vibration of the power tool can be more effectively inhibited from being increased during processing of the workpiece.

In addition or in the alternative to the preceding embodiments, the power tool may further have a housing. The housing may house the motor, the eccentric shaft, the motion converting mechanism and the balancer. The motion converting mechanism may have a spindle and a connection arm. The spindle may have a tool mounting part for mounting the tool accessory at an end and may be configured to oscillate the tool accessory by reciprocatingly rotating in a circumferential direction. The connection arm may have a first end fixed to the spindle and a second end connected to the eccentric shaft, and may be configured to be reciprocatingly rotated around the spindle by rotation of the eccentric shaft. The spindle may be supported to be reciprocatingly rotatable in the circumferential direction by a first bearing part provided within the housing and a second bearing part provided between the first bearing part and the tool mounting part within the housing. The first bearing part may be held by the housing via an elastic member. In the power tool having this structure, the elastic member absorbs vibration caused in the spindle by oscillation of the tool accessory, and thus inhibits transmission of the vibration to the housing via the spindle. Therefore, vibration of the power tool can be further inhibited from being increased during processing of the workpiece.

In addition or in the alternative to the preceding embodiments, the second bearing part may comprise a ball bearing. In the power tool having this structure, balls, which are rolling elements of the second bearing part, make it easier for the spindle to pivot within the housing on (about) a contact point(s) of at least one of the balls. Therefore, the elastic member that holds the first bearing part can more easily absorb vibration caused at the end of the spindle by oscillation of the tool accessory. Thus, vibration caused by oscillation of the tool accessory can be further inhibited from being transmitted to the housing.

In addition or in the alternative to the preceding embodiments, the motor may be arranged such that the rotation center axis crosses an oscillation axis of the tool accessory oscillates. In the power tool having this structure, the motor is arranged such that the rotary shaft of the motor extends horizontally to the oscillation axis around which the tool accessory oscillates.

A non-limiting, representative embodiment according to the present disclosure is now specifically described with reference to the drawings.

Figure 2:
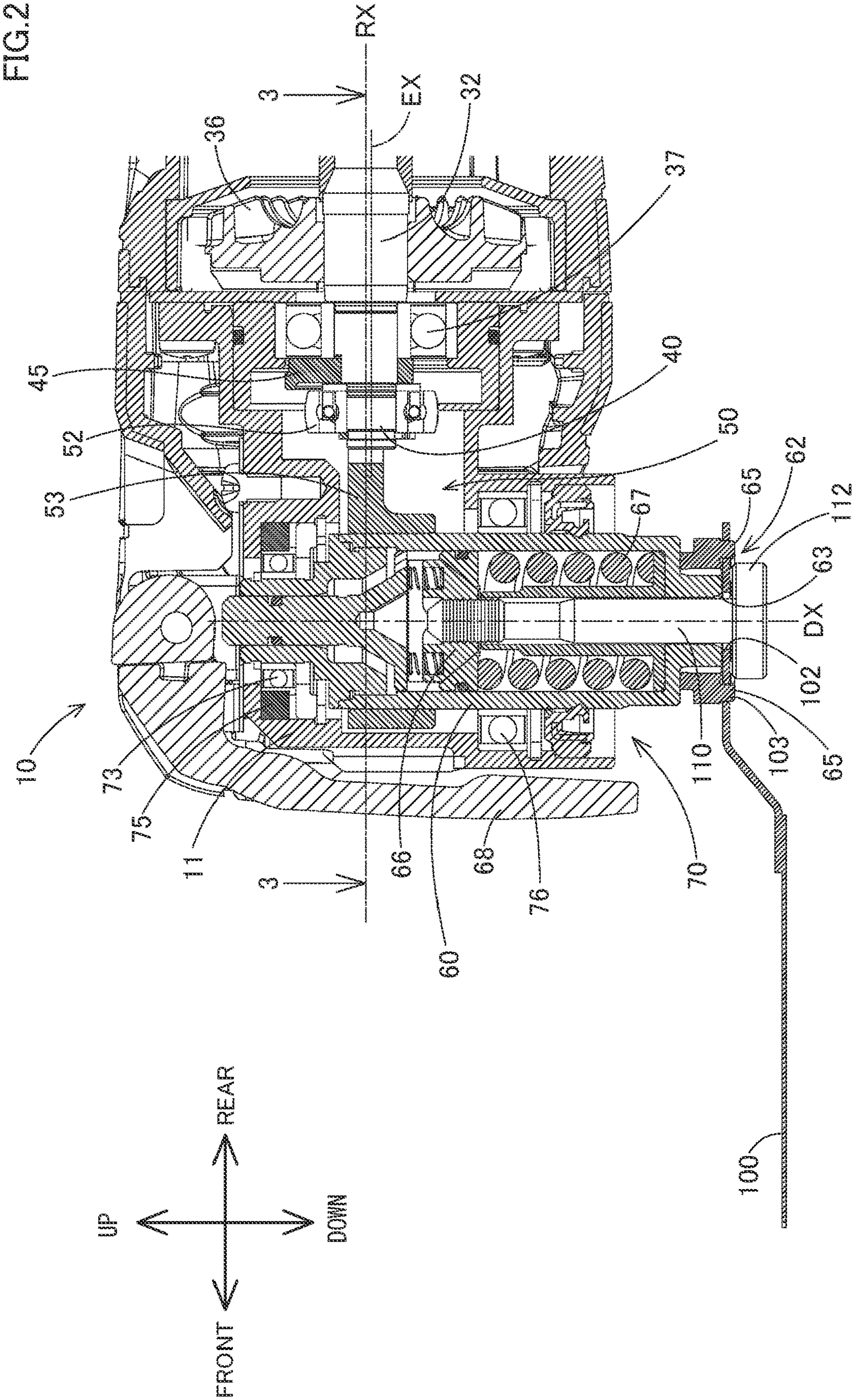
FIG. 2 is a partial, sectional view of a front end region 2 shown in FIG. 1.
Figure 3:
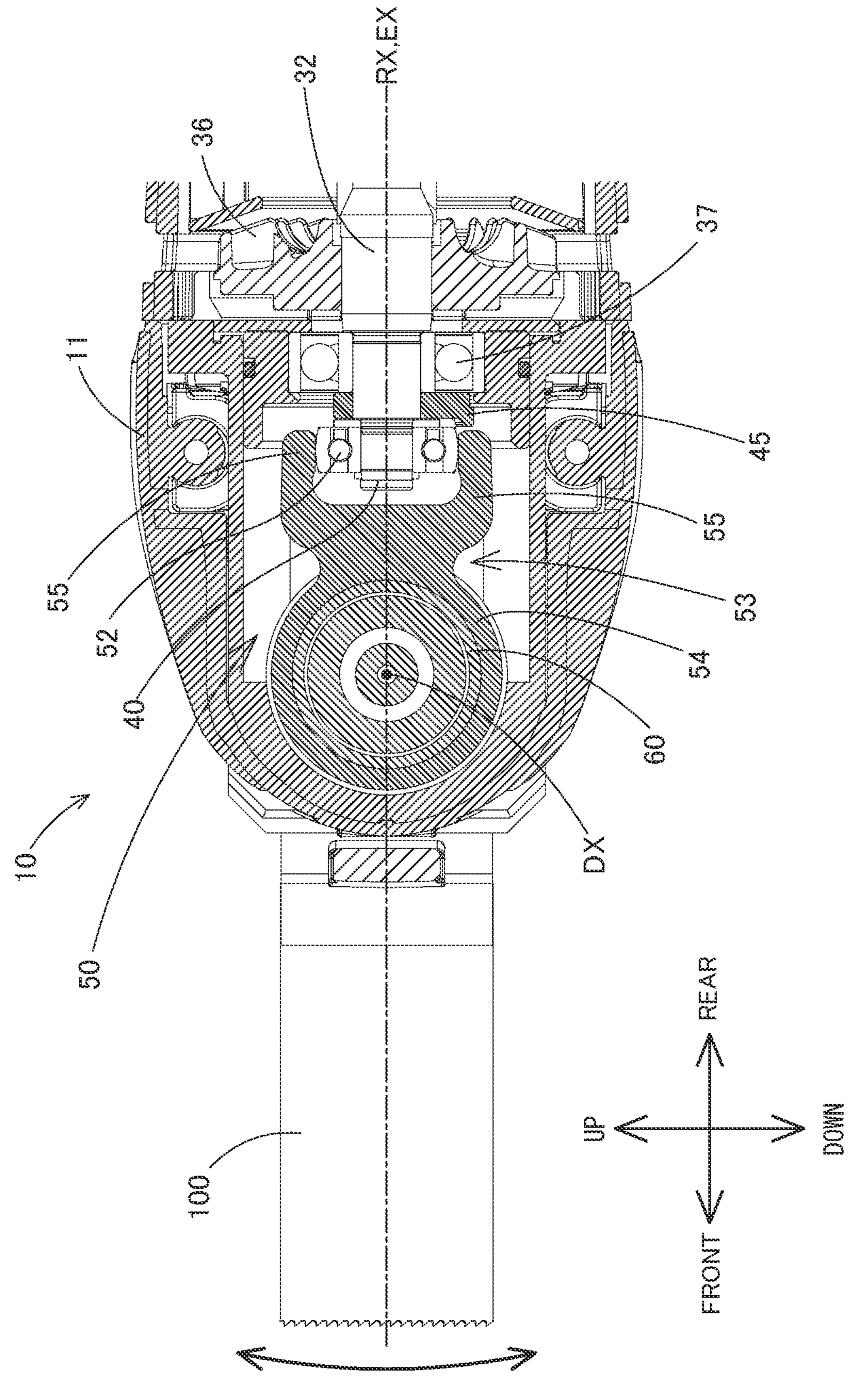
FIG. 3 is a partial, sectional view of the power tool, taken along line 3-3 in FIG. 2.

Referring to FIGS. 1 to 3, the structure of a power tool 10 of this embodiment is now briefly described. The power tool 10 is a representative example of an electric power tool which processes a workpiece (not shown) by driving a tool accessory 100 in an oscillating manner. As shown in FIG. 1, the power tool 10 has an elongate shape, and the tool accessory 100 is mounted to one end in a longitudinal direction of the power tool 10. The tool accessory 100 is detachable from the power tool 10 and replaceable. As shown in FIGS. 1 and 2, the tool accessory 100 is mounted to a lower end part of a spindle 60 described below, and the power tool 10 oscillates the tool accessory 100 around a center axis DX of the spindle 60 as shown in FIG. 3.

The power tool 10 is also called as a multi-tool. Various kinds of tool accessories 100 are provided for the power tool 10, and a user can select any of the tool accessories 100 according to the kind of processing on a workpiece and mount it to the power tool 10. The tool accessories 100 include first tool accessories used to process a workpiece with its tip or outer peripheral edge in contact with the workpiece and second tool accessories used to process a workpiece with its lower surface in contact with the workpiece. The tool accessories 100 includes such as a blade, a scraper, a grinding pad and a polishing pad. Processing a workpiece by using the tool accessories 100 include cutting, scraping, grinding and polishing.

In FIGS. 1 to 3, as an example of the tool accessory 100 to be used mainly for cutting, an elongate blade having cutting teeth on its tip is mounted to the power tool 10. In each drawing referred to in the following description, the blade is also shown as an example of the tool accessory 100, but the tool accessory 100 to be mounted to the power tool 10 is not limited to the blade.

The structure of the power tool 10 is now described in detail with reference to FIGS. 1 to 3 as well as the other drawings.

In the following description, for the sake of convenience, relating to the directions of the power tool 10, the "front-rear direction", "up-down direction" and "left-right direction" that are orthogonal to each other are defined as follows. Referring to FIG. 1, a direction along the longitudinal direction of the power tool 10 is defined as the front-rear direction, and in the front-rear direction of the power tool 10, one end side on which the tool accessory 100 is mounted is defined as a front side, while the other end side is defined as a rear side. Referring to FIGS. 1 and 2, a direction along the center axis DX of the spindle 60 to which the tool accessory 100 is mounted is defined as the up-down direction, and in the up-down direction, one end side of the spindle 60 on which the tool accessory 100 is mounted is defined as a lower side, while the other end side is defined as an upper side. Referring to FIG. 3, a direction orthogonal to the front-rear direction and the up-down direction is defined as a left-right direction. Arrows showing the front-rear direction, the up-down direction and the left-right direction are also appropriately shown in the drawings referred to in the following description in such a manner as to correspond to those in FIGS. 1 to 3.

Referring to FIG. 1, the power tool 10 includes a housing 11, a power supply part 20, a rotary drive mechanism 30 and a motion converting mechanism 50. The housing 11 forms an outer shell of the power tool 10. The housing 11 is an elongate hollow member and houses the power supply part 20, the rotary drive mechanism 30, the motion converting mechanism 50 and other components. In the power tool 10, a central part of the housing 11 in the longitudinal direction serves as a grip part to be held by a user. On the outside of the housing 11 are provided a tool mounting part 62, an operation part 27, a speed change operation part 28 and a lever 68, which will be described below.

The power supply part 20 is provided in a rear end part of the housing 11. The power supply part 20 serves as a power source part of the power tool 10. In this embodiment, the power supply part 20 is connected to a power cord 22 extending from the rear end part of the housing 11, and supplies power taken from an external power source through the power cord 22, to the rotary drive mechanism 30. In other embodiments, the power tool 10 may be configured such that a rechargeable battery is removably mounted to the housing 11, and the power supply part 20 may be configured to supply power of the battery to the rotary drive mechanism 30.

The power supply part 20 includes a control circuit 25 configured to control power to be supplied to the rotary drive mechanism 30. The control circuit 25 serves as a controller for controlling driving of the power tool 10. The control circuit 25 is configured to control start and stop of power supply to the rotary drive mechanism 30 according to on/off operation of the slide-type operation part 27 that is provided on an upper surface of the housing 11 and operated by a user. Further, the control circuit 25 is configured to control the rotation speed of a motor 31 by controlling power supply to the motor 31 of the rotary drive mechanism 30. In the power tool 10, the dial-type speed change operation part 28 that is operated by a user is provided on a lower end of the rear end part of the housing 11. The control circuit 25 is configured to control the rotation speed of the motor 31 by changing power to be supplied to the motor 31 according to the rotation angle of the speed change operation part 28. In the power tool 10, the oscillating speed of the tool accessory 100 changes according to the rotation speed of the motor 31.

The rotary drive mechanism 30 includes the motor 31, an eccentric shaft 40 and a balancer 45. The motor 31 is a driving power source and is driven by power supply from the power supply part 20. In this embodiment, a commutator motor is used as the motor 31. In other embodiments, a brushless DC motor may be used as the motor 31. The motor 31 has a rotary shaft 32 that is an output shaft for outputting rotation driving force, a rotor 33 that is fixedly fitted onto the rotary shaft 32, and a stator 34 that is arranged to surround the rotor 33.

The rotary shaft 32 is formed of a metal columnar member (round bar). The rotary shaft 32 is arranged along the front-rear direction substantially in the central part of the housing 11. Front and rear end parts of the rotary shaft 32 protrude from the stator 34. The rotary shaft 32 is rotationally driven together with the rotor 33 within the stator 34 by electromagnetic force. A rotation center axis RX of the rotary shaft 32 coincides with a center axis of the rotary shaft 32. In the power tool 10, the rotary shaft 32 is rotationally driven only in one predetermined direction. A fan 36 is mounted onto the rotary shaft 32 in front of the stator 34, and rotates together with the rotary shaft 32 and generates air flow for heat dissipation.

The rotary shaft 32 is rotatably supported by a front bearing part 37 and a rmar bearing part 38 that are fixed at prescribed positions within the housing 11. The front and rear bearing parts 37, 38 are, for example, ball bearings. The front bearing part 37 supports a front end part of the rotary shaft 32 that protrudes forward from the stator 34. The front bearing part 37 is provided in front of the fan 36. The rear bearing part 38 supports a rear end part of the rotary shaft 32 that protrudes rearward from the stator 34.

Referring to FIGS. 2 and 3, the eccentric shaft 40 is a generally columnar metal member (round bar) having a smaller diameter than the rotary shaft 32. The eccentric shaft 40 is integrally connected to the rotary shaft 32 and extends forward from a front end of the rotary shaft 32 so as to be eccentric to the rotation center axis RX in a radial direction. The “radial direction” here means a direction orthogonal to the rotation center axis RX. A center axis of the eccentric shaft 40 is hereinafter also referred to as an “eccentric axis EX”. The eccentric axis EX is substantially parallel to the rotation center axis RX. In FIG. 3, the rotation center axis RX overlaps the eccentric axis EX in the up-down direction. The eccentric shaft 40 is rotated (revolved) around the rotation center axis RX at a position eccentric from the rotation center axis RX in the radial direction by rotation of the rotary shaft 32 when the motor 31 is driven. In the power tool 10, the tool accessory 100 is oscillated by this eccentric rotation of the eccentric shaft 40.

The balancer 45 is a weight mounted onto an outer periphery of the rotary shaft 32 and rotates together with the rotary shaft 32. The balancer 45 is fixed to the rotary shaft 32 between the eccentric shaft 40 and the front bearing part 37 in the front-rear direction. The position of the center of gravity of the balancer 45 is offset (displaced) from the rotation center axis RX in the radial direction. The position of the center of gravity of the balancer 45 is adjusted such that a centrifugal force, which is generated by rotation of the balancer 45 by the motor 31, acts in a direction to cancel (offset) a centrifugal force generated by the eccentric rotation of the eccentric shaft 40. Further, the position of the center of gravity of the balancer 45 is adjusted such that a centrifugal force, which is generated by rotation of the balancer 45 by the motor 31, acts in a direction to reduce resistance generated between the tool accessory 100 and a workpiece during processing of the workpiece with the power tool 10. The shape of the balancer 45 and the position of the center of gravity of the balancer 45 and the effect obtained by such setting of the position of the center of gravity will be described in detail below.

Referring to FIGS. 2 and 3, the motion converting mechanism 50 is configured to connect the tool accessory 100 and the eccentric shaft 40 and convert one revolution of the eccentric shaft 40 to one reciprocating oscillation of the tool accessory 100. The motion converting mechanism 50 includes a bearing 52, a connection arm 53 and a spindle 60.

The bearing 52 is fitted to surround the outer periphery of the eccentric shaft 40, and the eccentric shaft 40 is connected to the connection arm 53 via the bearing 52. The bearing 52 is, for example, a ball bearing. The interposed bearing 52 reduces friction that is caused between the eccentric shaft 40 and the connection arm 53 by eccentric rotation of the eccentric shaft 40. Further, in this embodiment, the bearing 52 has a spherical outer peripheral surface that is curved such that its central part in a direction along a center axis of the bearing 52 bulges outward in a radial direction orthogonal to the center axis. A bearing having such a curved outer peripheral surface may be called as a sphere bearing.

Referring to FIG. 3, the connection arm 53 has a first end fixed to the spindle 60 and a second end connected to the eccentric shaft 40, and is configured to be reciprocatingly rotated around the spindle 60 by rotation of the eccentric shaft 40. The connection arm 53 has a front annular part 54 and a pair of arm parts 55 extending from a rear end of the annular part 54. The annular front part 54 and the arm parts 55 correspond to the above-described “a first end” and “a second end” of the connection arm 53, respectively. As shown in FIGS. 2 and 3, the spindle 60 having a body formed of a cylindrical metal member is inserted through a central through hole of the annular part 54. The annular part 54 is fixedly fitted onto an upper end part of the spindle 60. As shown in FIG. 3, the arm parts 55 are arranged in the left-right direction and extend rearward from the rear end of the annular part 54. In this embodiment, each of the arm parts 55 has a square columnar shape. The connection arm 53 is connected to the eccentric shaft 40 by the arm parts 55 holding from left and right the bearing 52 fitted onto the eccentric shaft 40. The arm parts 55 are not adhered or otherwise fixed to the left and right side surfaces of the bearing 52, but just held in contact therewith. The mechanism of reciprocating rotation of the connection arm 53 around the center axis DX of the spindle 60 by rotation of the eccentric shaft 40 will be described below.

Referring to FIG. 2, a lower end part of the spindle 60 protrudes from the housing 11, and the tool mounting part 62 is provided on a lower end of the spindle 60 and located outside of the housing 11. The spindle 60 holds the tool accessory 100 on the tool mounting part 62 and serves as a fulcrum of oscillation of the tool accessory 100.

The spindle 60 is arranged in a front end part of the power tool 10 such that the center axis DX crosses the rotation center axis RX and held by a spindle holding mechanism 70. In this embodiment, the center axis DX of the spindle 60 is substantially orthogonal to the rotation center axis RX. The spindle holding mechanism 70 holds the spindle 60 so as to be rotatable around the center axis DX. The tool accessory 100 mounted onto the tool mounting part 62 oscillates by reciprocating rotation of the spindle 60 around the center axis DX. The center axis DX of the spindle 60 is also referred to as a “driving axis DX”.

As described above, in the power tool 10, the rotation center axis RX crosses the driving axis DX, which serves as the oscillation axis of the tool accessory 100. With this arrangement, the motor 31 can be arranged such that the rotary shaft 32 of the motor 31 crosses the driving axis DX. With this arrangement of the motor 31, the internal space of the central part of the housing 11 that serves as the above-described grip part can be effectively utilized as a housing part for the motor 31.

The tool accessory 100 is mounted to the tool mounting part 62 of the spindle 60 as follows. The tool mounting part 62 has a lower end opening 63 that is open at the lower end of the spindle 60 and communicates with the internal space of the spindle 60, and a plurality of projections 65 that are formed around the lower end opening 63 and protrude downward. The tool accessory 100 is fixed to the tool mounting part 62 via a fastening shaft 110. The fastening shaft 110 is inserted into the internal space of the spindle 60 through the lower end opening 63 of the tool mounting part 62. The fastening shaft 110 is fixed to the spindle 60 by being applied upward biasing force from a coil spring 67 in the state where the upper end of the fastening shaft 110 is clamped by clamping members 66 within the spindle 60.

In a base end part of the tool accessory 100, a through hole 102 and fitting holes 103 are provided. The fastening shaft 110 is inserted into the through hole 102. The projections 65 of the tool mounting part 62 fit into the fitting holes 103. A head 112 locally increased in diameter and extending laterally is provided on a lower end of the fastening shaft 110. When the fastening shaft 110 is inserted into the spindle 60 through the through hole 102 of the tool accessory 100 and fixed, a periphery of the through hole 102 of the tool accessory 100 is clamped between the head 112 of the fastening shaft 110 and a lower end surface of the spindle 60. This inhibits the tool accessory 100 from slipping down from the spindle 60.

Although not described in detail, in the power tool 10, the lever 68 is arranged along a front end surface of the housing 11 as shown in FIGS. 1 and 2, and when the lever 68 is turned upward, the coil spring 67 within the spindle 60 is elastically deformed in a contracting direction. Then, the fastening shaft 110 fixed by the biasing force of the coil spring 67 is unfixed, so that the fastening shaft 110 and the tool accessory 100 can be removed from the spindle 60. In other embodiments, the fastening shaft 110 may be fixed to the spindle 60 by any other fixing method, such as screwing and a different clamping method from that of this embodiment.

Referring to FIG. 3, the mechanism of oscillating the tool accessory 100 by eccentric rotation of the eccentric shaft 40 is now described. In the eccentric rotation of the eccentric shaft 40, the eccentric shaft 40 reciprocates in the left-right direction relative to the rotation center axis RX. By this reciprocation of the eccentric shaft 40, the arm parts 55 of the connection arm 53 are rotated in the left-right direction, and reciprocatingly rotate the spindle 60 fixed to the annular part 54, in a circumferential direction around the driving axis DX. Consequently, the tool accessory 100 fixed to the tool mounting part 62 on the lower end of the spindle 60 oscillates around the driving axis DX. The angle of oscillation of the tool accessory 100 is, for example, about one to five degrees.

Referring to FIG. 2, the spindle holding mechanism 70 is provided within a front end part of the housing 11 and holds the spindle 60 so as to be rotatable in the circumferential direction around the driving axis DX. The spindle holding mechanism 70 includes a first bearing part 73, an elastic member 75 and a second bearing part 76.

The first bearing part 73 is provided on an upper end part of the spindle 60 and supports the spindle 60 so as to be rotatable in the circumferential direction. The first bearing part 73 is, for example, a ball bearing. The elastic member 75 is fitted onto an outer periphery of the first bearing part 73, and the first bearing part 73 is held by the housing 11 via the elastic member 75. The elastic member 75 is, for example, an O-ring formed of rubber or resin. The elastic member 75 absorbs vibration caused in the spindle 60 by oscillation of the tool accessory 100 during operation of the power tool 10, and thus inhibits vibration caused by oscillation of the tool accessory 100 from being transmitted to the housing 11 via the spindle 60.

The second bearing part 76 is fixed to the housing 11 between the first bearing part 73 and the tool mounting part 62, and supports the spindle 60 so as to be rotatable in the circumferential direction. The second bearing part 76 is provided below the connection arm 53. The second bearing part 76 supports a central area of the spindle 60 in the up-down direction.

In this embodiment, the second bearing part 76 is a ball bearing. In a ball bearing, balls, which are rolling elements, are each in point contact with an inner ring and an outer ring. The spindle 60 is fixed to the inner ring of the second bearing part 76. Thus, it can be said that the spindle 60 is supported by the balls that are each substantially in point contact with the spindle 60. If, for example, a roller bearing such as a needle bearing is employed in place of the ball bearing for the second bearing part 76, the rolling elements are rollers, and the spindle 60 is supported by the rollers that are each substantially in line contact with the spindle 60. The spindle 60 can more easily pivot relative to the housing 11 on (about) a contact (support) point(s) between the spindle 60 and at least one of the rolling elements when the rolling elements are in point contact with the spindle 60, than when the rolling elements are in line contact with the spindle 60. Therefore, by employing the ball bearing as the second bearing part 76, the elastic member 75 disposed between the first bearing part 73 and the housing 11 can more easily absorb vibration of the spindle 60 caused by oscillation of the tool accessory 100. Thus, vibration caused by oscillation of the tool accessory 100 can be further effectively inhibited from being transmitted to the housing 11.

Referring to FIGS. 4 to 11, the shape of the balancer 45 and the position of the center of gravity of the balancer 45 are now described in detail.

Figure 4:
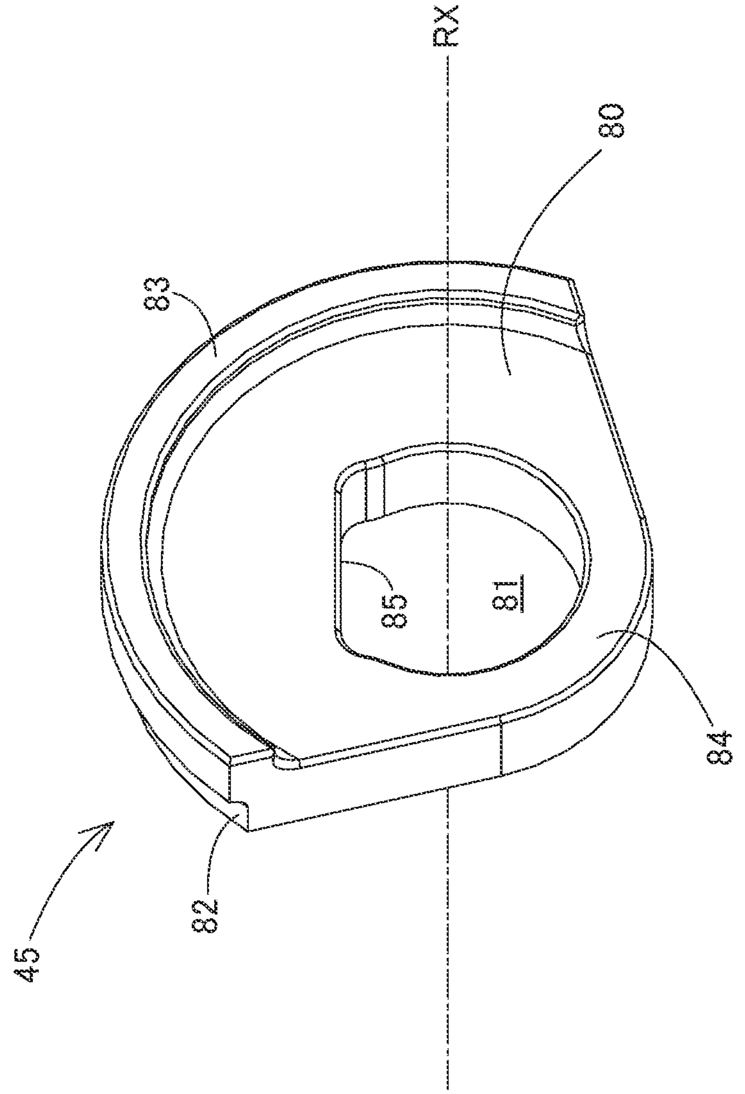
FIG. 4 is a perspective view of a balancer.

As shown in FIG. 4, the balancer 45 has a base 80. The base 80 has an insertion hole 81 formed therethrough, and the rotary shaft 32 is inserted through the base 80 via the insertion hole 81. In this embodiment, the balancer 45 is a metal plate-like member. The base 80 has a flat plate-like shape. The base 80 is shaped like a sector (fan) when viewed in a thickness direction of the base 80. In other words, the base 80 is formed as a substantially sectorial (fan-shaped) plate. The rotary shaft 32 is inserted through the base 80 in the thickness direction via the insertion hole 81.

The balancer 45 has a projection 83 protruding from a side face of the base 80 in a direction along (parallel to) the rotation center axis RX. In this specification, the side face of the base 80 refers to either one of a pair of faces of the base 80 facing toward a direction along the rotation center axis RX. In this embodiment, the projection 83 is formed on an outer edge part 82 that forms a circular arc of the base 80. The projection 83 extends in a circular arc shape along the outer edge part 82. The projection 83 has a part protruding radially outward from the outer edge part 82. Further, in this embodiment, the projection 83 protrudes forward. In other embodiments, the projection 83 may protrude rearward. Alternatively, the balancer 45 may have two projections 83 protruding forward and rearward, respectively.

In the balancer 45, a corner part formed between two linear sides of the sector-shaped base 80 is rounded and forms around corner part 84. An angle corresponding to a central angle of the sector is about 80 to 110 degrees. The insertion hole 81 is formed in a position closer to the round corner part 84 than to the outer edge part 82 forming the circular arc. The insertion hole 81 has a section having a generally D-shape, which is obtained by cutting out a portion of a circle. An inner peripheral surface of the insertion hole 81 thus includes a flat cut-out part 85.

Figure 5:
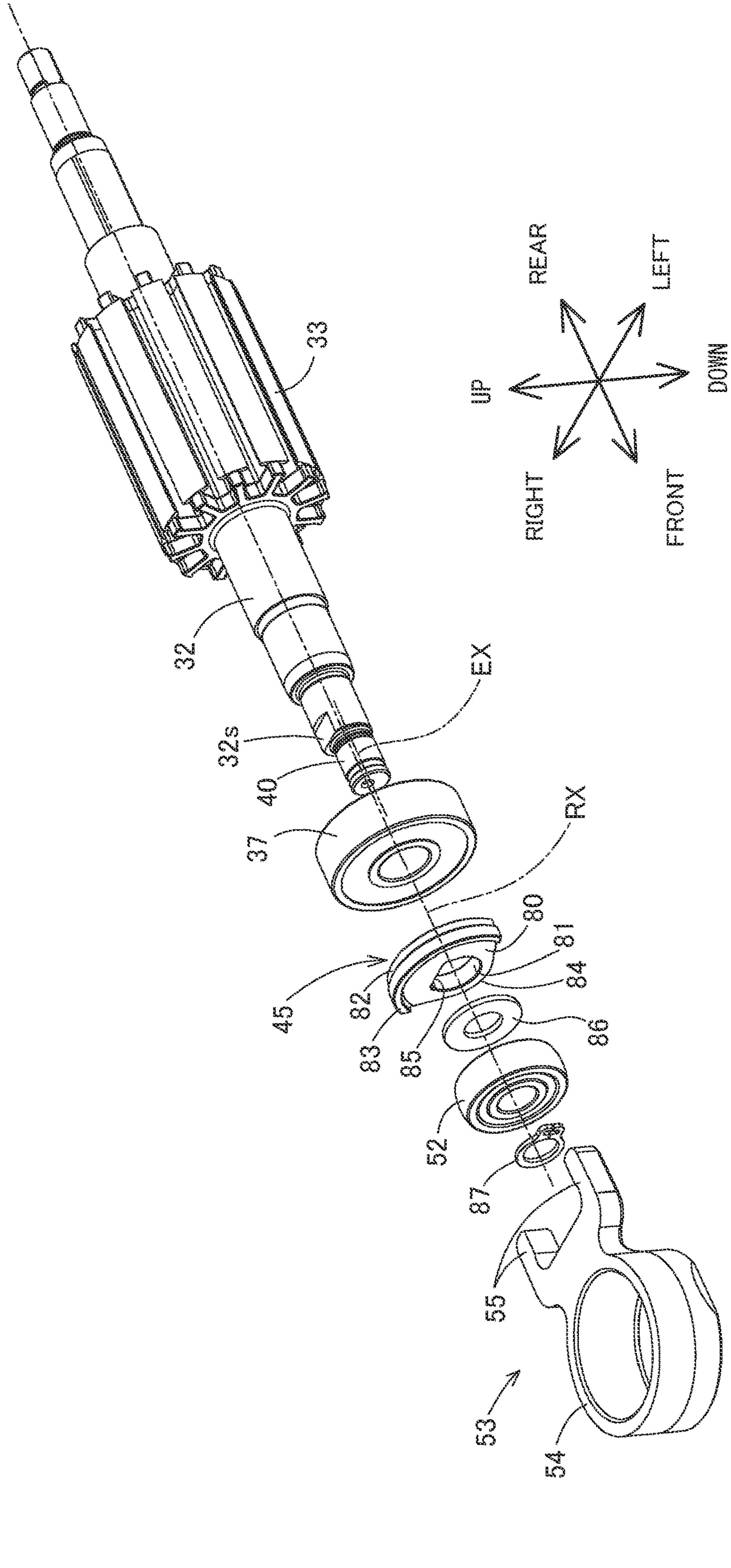
FIG. 5 is an exploded perspective view showing a rotary drive mechanism and a connection arm of a motion converting mechanism.
Figure 6:
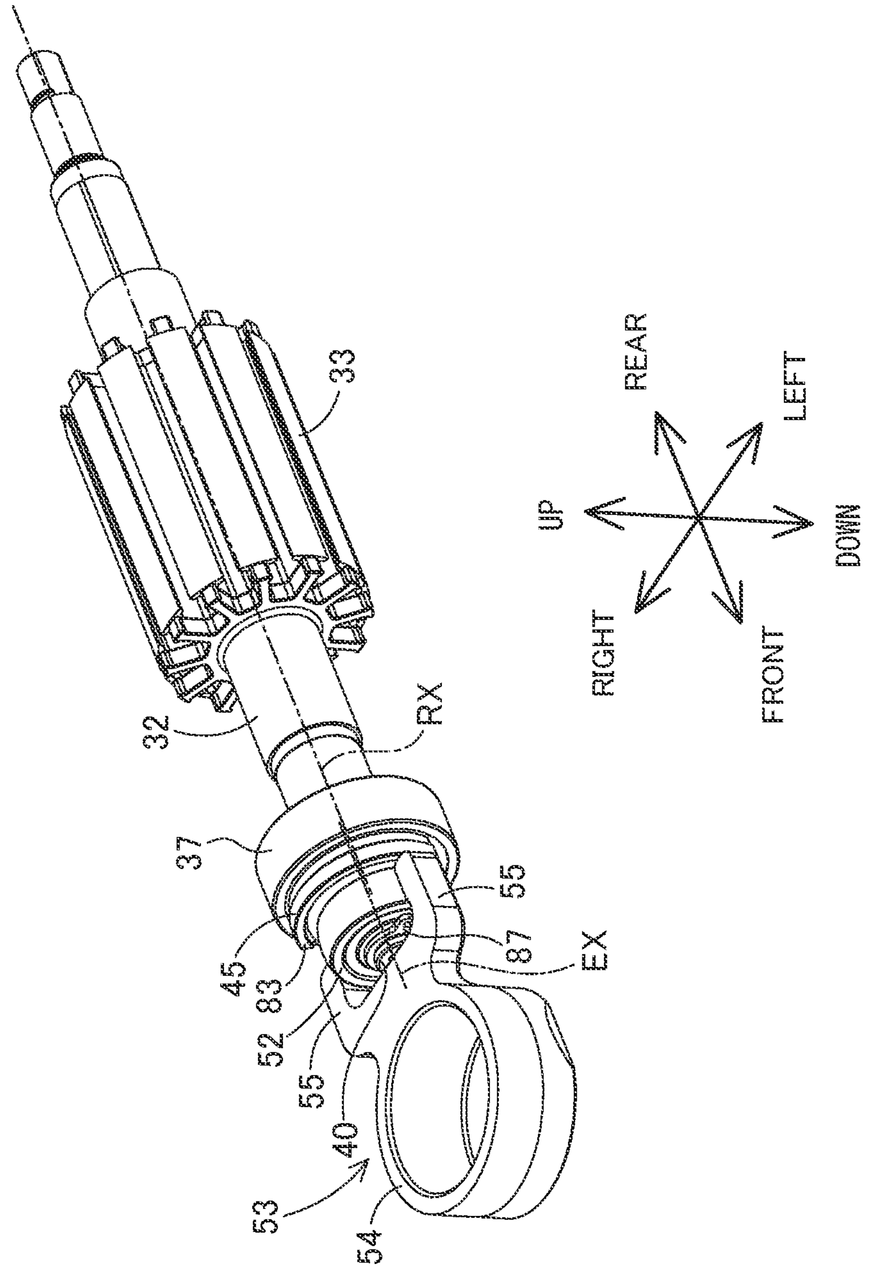
FIG. 6 is a perspective view showing the rotary drive mechanism and the connection arm of the motion converting mechanism.

Referring to FIGS. 5 and 6, in assembling the power tool 10, the balancer 45 is fitted onto the rotary shaft 32 after the front bearing part 37 is fitted thereon. As shown in FIG. 5, a cut-out wall surface **32*s* is formed by cutting out a portion of a side face of a front end part of the round rotary shaft 32 such that the front end part can be fitted into the insertion hole 81 of the balancer 45. By engagement between the cut-out part 85 of the insertion hole 81 and the cut-out wall surface 32*s* of the rotary shaft 32, the mounting angle of the balancer 45 in a direction around the rotation center axis RX is defined, and the position of the center of gravity of the balancer 45 relative to the eccentric axis EX of the eccentric shaft 40** is defined as described below.

After the balancer 45 is mounted, the bearing 52 is fitted onto the eccentric shaft 40, which extends from the front end of the rotary shaft 32, in front of the balancer 45. A washer 86 is disposed between the balancer 45 and the bearing 52. A snap ring 87 for inhibiting the bearing 52 from slipping off the eccentric shaft 40 is fitted onto a front end part of the eccentric shaft 40. Subsequently, the connection arm 53 is mounted such that the arm parts 55 hold from left and right the outer periphery of the bearing 52 fitted onto the eccentric shaft 40.

Figure 7:
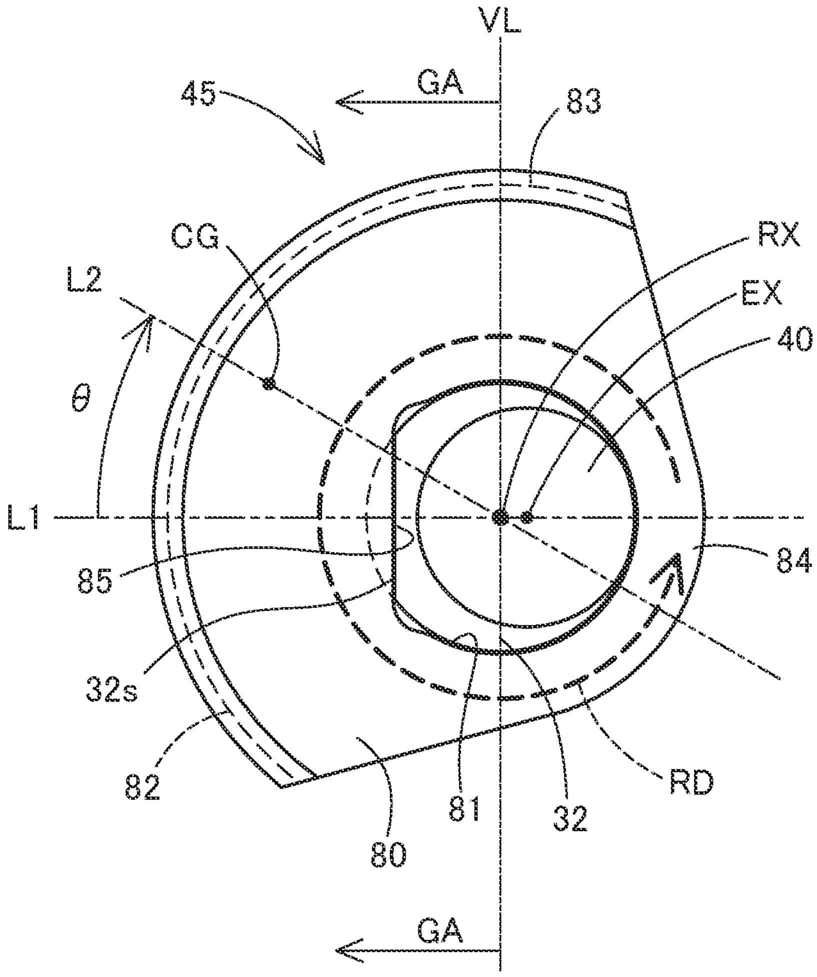
FIG. 7 is a schematic view of the balancer fitted onto a rotary shaft, when viewed along the rotation center axis RX.

Referring to FIG. 7, the state of the balancer 45 when viewed along (parallel to) the rotation center axis RX is shown and described. The state of the balancer 45 "when viewed along (parallel to) the rotation center axis RX" means the state of the balancer 45 "when viewed from the front or the rear". FIG. 7 shows the balancer 45 when viewed from the front. The balancer 45 has a center of gravity CG in a region GA, which is located on a first direction side of the rotation center axis RX. The first direction here refers to a direction toward the rotation center axis RX from the eccentric axis EX. More specifically, the center of gravity CG of the balancer 45 is in the region GA that is on the side opposite to the eccentric axis EX across an imaginary perpendicular line VL. The imaginary perpendicular line VL passes the rotation center axis RX and crosses perpendicularly to a first imaginary line L1. The first imaginary line L1 passes the eccentric axis EX and the rotation center axis RX. Rotation of the balancer 45 having the center of gravity CG in the region GA can generate a centrifugal force having a component that acts in a direction opposite to a centrifugal force generated by eccentric rotation of the eccentric shaft 40 when the motor 31 is rotationally driven. This inhibits vibration from being caused in the power tool 10 by action of the centrifugal force generated by rotation of the eccentric shaft 40.

A second imaginary line L2 passes the rotation center axis RX and the center of gravity CG of the balancer 45. The second imaginary line L2 is inclined relative to the first imaginary line L1. The second imaginary line L2 is inclined at an inclination angle θ larger than 0° and smaller than 90° in a direction opposite to a rotating direction RD of the rotary shaft 32 relative to the first imaginary line L1. According to this configuration, when the power tool 10 is driven to process a workpiece with the tool accessory 100, rotation of the balancer 45 generates the centrifugal force that acts in such a direction that the centrifugal force can reduce or cancel (offset) the resistance according to the period of increase of the resistance generated between the tool accessory 100 and the workpiece.

Action of the centrifugal force generated by rotation of the balancer 45 is now described in detail.

FIGS. 8 to 11 show the balancer 45 and the tool accessory 100 at every 90° of the rotation angle of the rotary shaft 32 in time order when the rotary shaft 32 makes one revolution (rotates once) and the tool accessory 100 makes one reciprocating oscillation (reciprocates once in an oscillating manner). FIGS. 8 to 11 show the balancer 45 mounted onto the rotary shaft 32 when viewed from the front along the rotation center axis RX, on the upper section of each drawing, and also show the tool accessory 100 when viewed from above along the driving axis DX, on the lower section of each drawing.

On each upper section of FIGS. 8 to 11, the up-down direction and the left-right direction shown by arrows correspond to the arrangement attitudes of the rotary shaft 32, the eccentric shaft 40 and the balancer 45 in the power tool 10. On each lower section of FIGS. 8 to 11, an oscillation range SA in which the tool accessory 100 oscillates during operation of the power tool 10 is shown by two-dot chain lines. In FIGS. 8 to 11, the angle of oscillation of the tool accessory 100 around the driving axis DX is shown extremely large in order to make it easy to understand how the tool accessory 100 oscillates.

Figure 8:
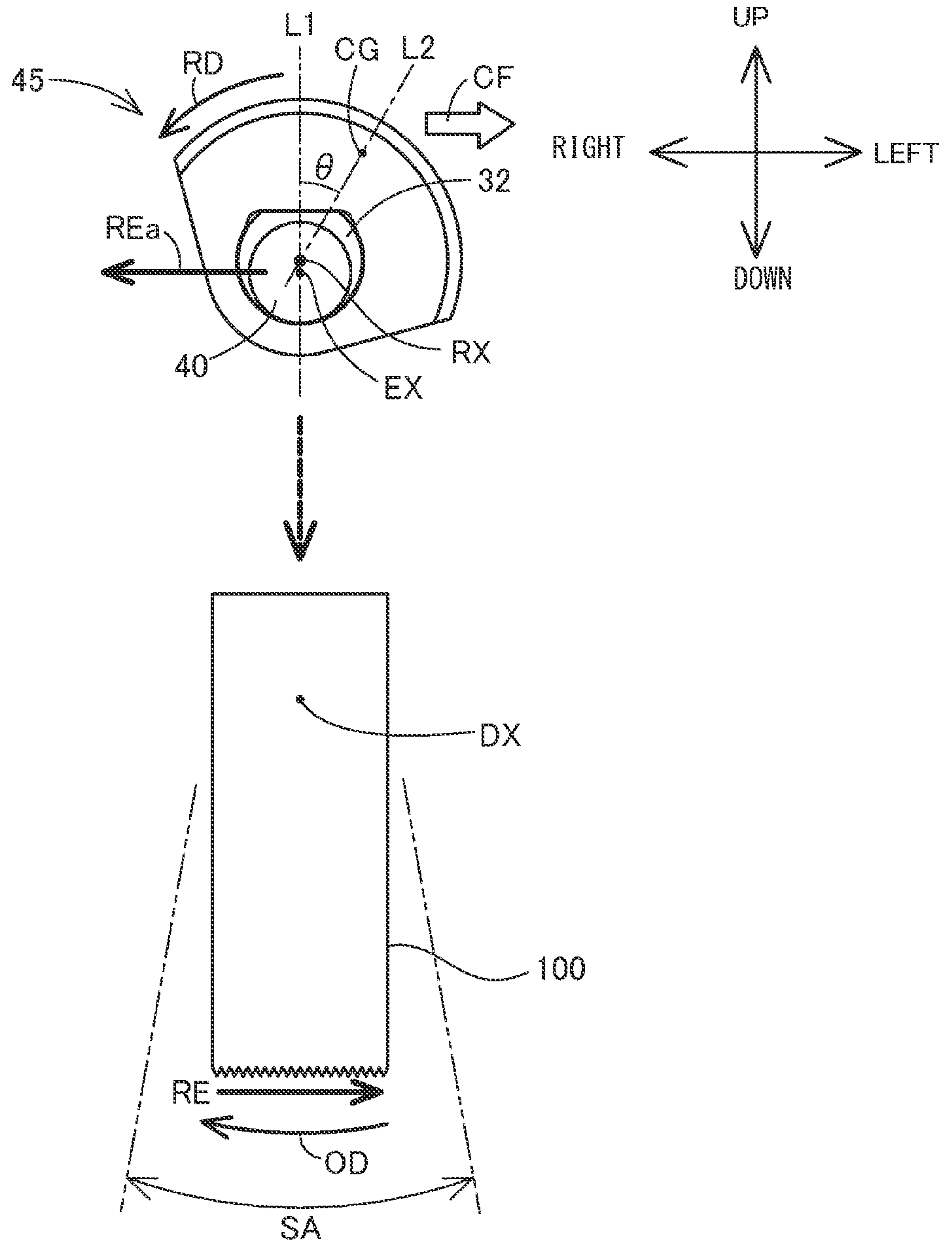
FIG. 8 is a first schematic view for illustrating how a tool accessory is oscillated by rotation of the rotary shaft.
Figure 9:
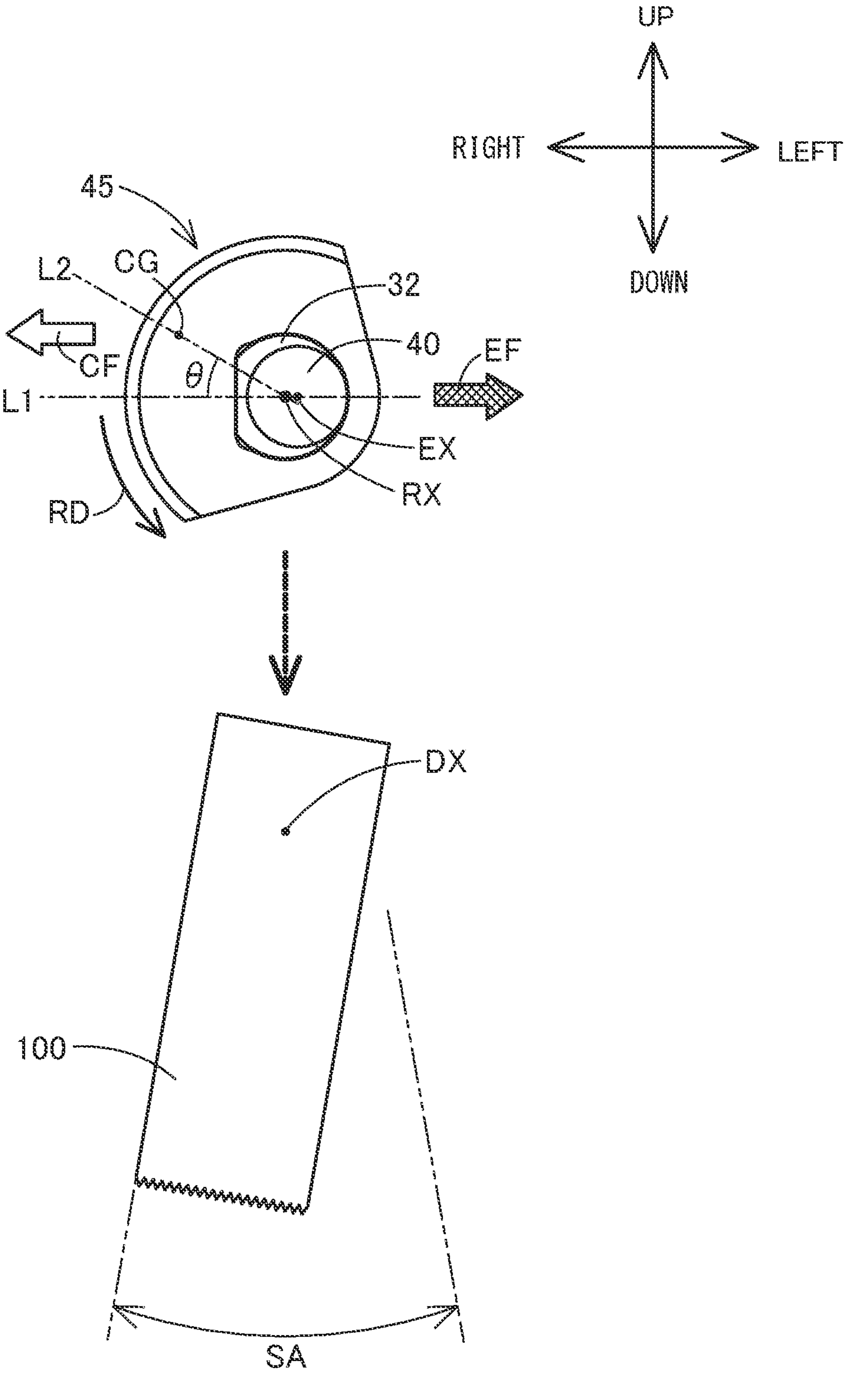
FIG. 9 is a second schematic view for illustrating how the tool accessory is oscillated by rotation of the rotary shaft.

FIG. 8 shows the state where the rotation center axis RX is located directly above the eccentric axis EX (i.e., the rotation center axis RX overlaps with the eccentric axis EX in the up-down direction). In this state, the tool accessory 100 is located in the center of the oscillation range SA. When the rotary shaft 32 rotates 90° in the rotating direction RD of the motor 31 from the state shown in FIG. 8, the eccentric axis EX eccentrically rotates around the rotation center axis RX to a position located side by side with the rotation center axis RX in the left-right direction as shown in FIG. 9. In FIG. 9, the eccentric axis EX is located on the left side of the rotation center axis RX. In the meantime, the tool accessory 100 rotates around (pivots, oscillates about) the driving axis DX from the center position shown in FIG. 8 to one end (left end as viewed in FIG. 9) of the oscillation range SA.

Figure 10:
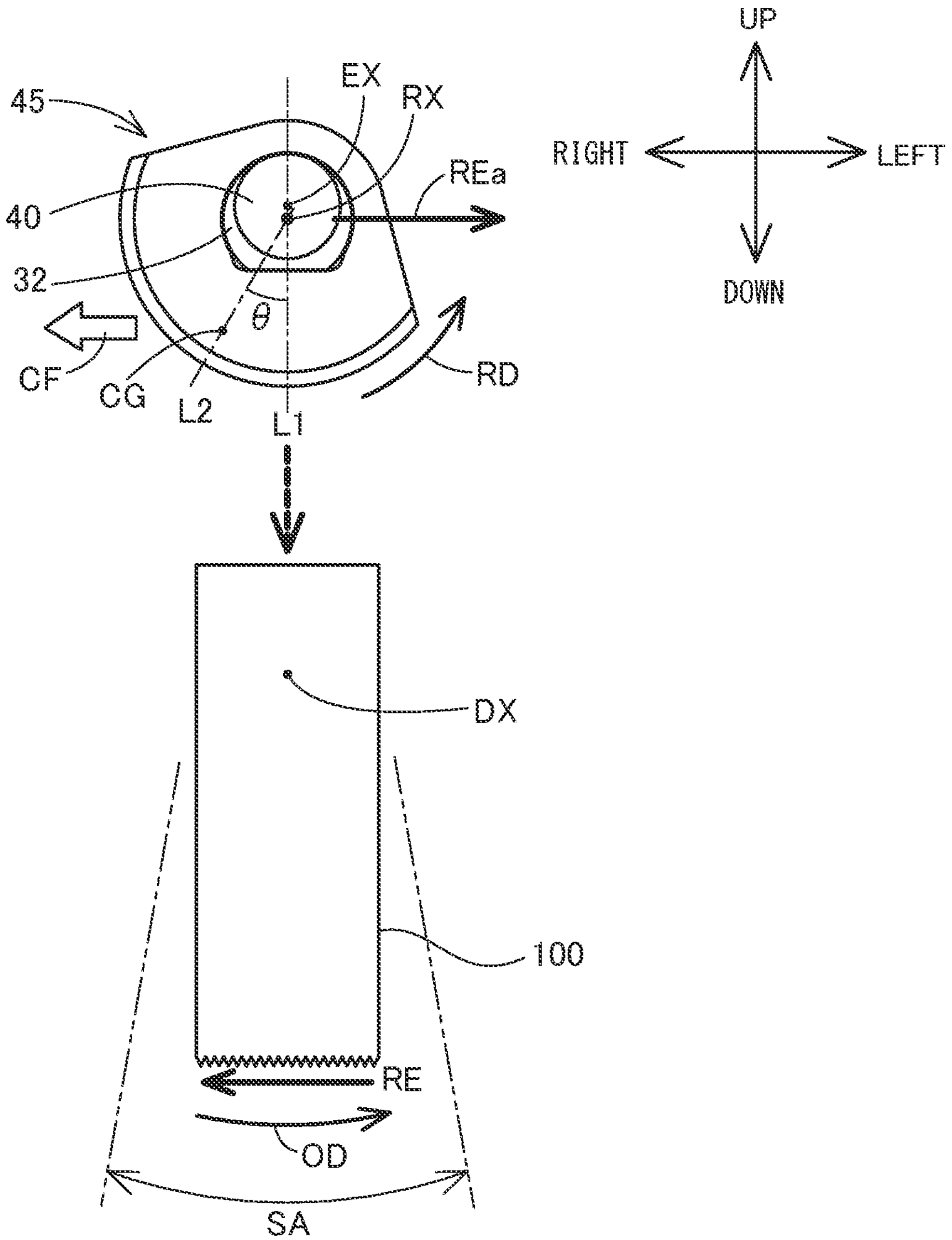
FIG. 10 is a third schematic view for illustrating how the tool accessory is oscillated by rotation of the rotary shaft.
Figure 11:
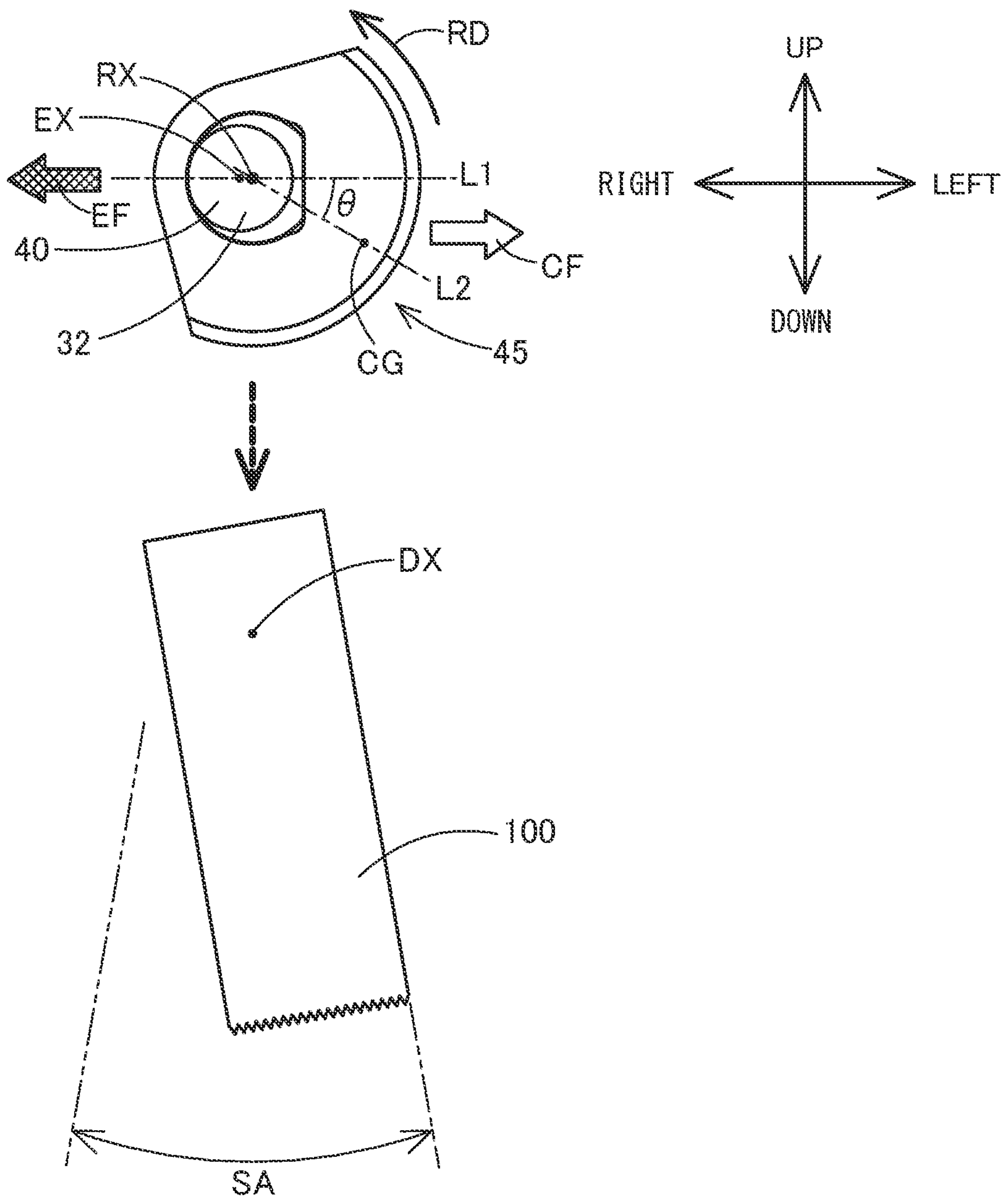
FIG. 11 is a fourth schematic view for illustrating how the tool accessory is oscillated by rotation of the rotary shaft.

When the rotary shaft 32 rotates 90° in the rotating direction RD of the motor 31 from the state shown in FIG. 9, the eccentric axis EX eccentrically rotates around the rotation center axis RX to a position located directly above the rotation center axis RX (i.e., the eccentric axis EX overlaps with the rotation center axis RX in the up-down direction) as shown in FIG. 10. Along with this, the tool accessory 100 rotates from the position shown in FIG. 9 to the center position of the oscillation range SA. When the rotary shaft 32 rotates 90° in the rotating direction RD of the motor 31 from the state shown in FIG. 10, the eccentric axis EX eccentrically rotates around the rotation center axis RX to a position located side by side with the rotation center axis RX on the side opposite to that shown in FIG. 9 in the left-right direction as shown in FIG. 11. In FIG. 11, the eccentric axis EX is located on the right side of the rotation center axis RX. The tool accessory 100 rotates around the driving axis DX from the center position shown in FIG. 10 to the other end (right end as viewed in FIG. 11) of the oscillation range SA. The movements shown in FIGS. 8 to 11 are repeated while the motor 31 is driven.

In the states shown in FIGS. 9 and 11, as shown by arrow CF, the centrifugal force generated by rotation of the balancer 45 has a component in a direction to cancel the centrifugal force EF that is generated by the eccentric rotation of the eccentric shaft 40. Therefore, rotation of the balancer 45 inhibits vibration from being increased due to the centrifugal force generated by eccentric rotation of the eccentric shaft 40 during operation of the power tool 10.

As shown in FIGS. 8 and 10, the resistance that is generated between the tool accessory 100 and a workpiece during processing of the workpiece with the power tool 10 acts on the tool accessory 100 in a direction opposite to an oscillating direction OD of the tool accessory 100 as shown by arrow RE, while acting on the eccentric shaft 40 in a direction to obstruct the eccentric rotation of the eccentric shaft 40 as shown by arrow REa. This resistance is maximized when the tool accessory 100 is located in the center of the oscillation range SA. As described above, in this embodiment, the center of gravity CG of the balancer 45 is on the second imaginary line L2 that is inclined at the inclination angle θ larger than 0° and smaller than 90° in a direction opposite to the rotating direction RD of the rotary shaft 32 relative to the first imaginary line L1. With this structure, at the timings shown in FIGS. 8 and 10, as shown by arrow CF, the centrifugal force generated by rotation of the balancer 45 has a component in a direction to promote eccentric rotation of the eccentric shaft 40, i.e. to cancel the above-described resistance acting on the eccentric shaft 40. Thus, in the power tool 10, the centrifugal force can be generated by rotation of the balancer 45 that acts in the direction to cancel the resistance generated between the tool accessory 100 and the workpiece, at the timing of increase of the resistance during processing of the workpiece. Therefore, vibration of the power tool 10 is inhibited from being increased due to the resistance generated between the tool accessory 100 and the workpiece during processing of the workpiece.

For comparison with this embodiment, in a first comparative example, it is assumed that the center of gravity CG of the balancer 45 is located on the second imaginary line L2, which is hypothetically inclined at an inclination angle θ of 0° relative to the first imaginary line L1 (i.e., the second imaginary line L2 coincides with the first imaginary line L1). In this comparative example, the centrifugal force generated by rotation of the balancer 45 hardly has a component in the direction to cancel the influence of the resistance generated between the tool accessory 100 and a workpiece. Therefore, in the first comparative example, vibration caused during processing of a workpiece is hardly reduced.

In a second comparative example, it is assumed that the center of gravity CG of the balancer 45 is located on the second imaginary line L2, which is hypothetically inclined at an inclination angle θ of 90° or 270°. In this comparative example, the centrifugal force generated by rotation of the balancer 45 hardly has a component in the direction to cancel (offset) the centrifugal force generated by eccentric rotation of the eccentric shaft 40. Therefore, in the second comparative example, vibration may be increased when the tool accessory 100 is not in contact with a workpiece.

In a third comparative example, it is assumed that the center of gravity CG of the balancer 45 is located on the second imaginary line L2, which is hypothetically inclined at an inclination angle θ that is larger than 90° and smaller than 270°. In this comparative example, the centrifugal force generated by rotation of the balancer 45 has a component in a direction to increase the influence of the centrifugal force generated by eccentric rotation of the eccentric shaft 40. Therefore, in the third comparative example, vibration may be increased when the tool accessory 100 is not in contact with a workpiece.

In a fourth comparative example, it is assumed that the center of gravity CG of the balancer 45 is located on the second imaginary line L2, which is hypothetically inclined at an the inclination angle θ is larger than 180° and smaller than 360°. In this case, the centrifugal force generated by rotation of the balancer 45 has a component in the same direction as the resistance generated between the tool accessory 100 and a workpiece. This may inhibit oscillation of the tool accessory 100 and thus reduce the performance of processing the workpiece.

In this embodiment, the center of gravity CG of the balancer 45 is located on the second imaginary line L2 that is inclined at the inclination angle θ that is larger than 0° and smaller than 90°. Thus, as described above with reference to FIGS. 8 to 11, both vibrations caused when the tool accessory 100 is not in contact with a workpiece and when the tool accessory 100 is in contact with a workpiece can be reduced. The inclination angle θ is preferably larger than 10° and smaller than 60°, and more preferably larger than 15° and smaller than 50°. With this structure, the vibration reducing effect can be obtained in a better-balanced manner both when the tool accessory 100 is not in contact with a workpiece and when the tool accessory 100 is in contact with a workpiece. The inclination angle θ may be, for example, larger than 20° and smaller than 45°, or larger than 25° and smaller than 40°. The inclination angle θ may be appropriately determined in consideration of various conditions such as the weight of the balancer 45, the position of the eccentric axis EX relative to the rotation center axis RX and the range of rotation speed of the motor 31.

Referring to FIG. 7, in this embodiment, the balancer 45 has an asymmetrical shape to the first imaginary line L1 when viewed along the rotation center axis RX. This facilitates positioning the center of gravity CG of the balancer 45 at a position offset (displaced) from the first imaginary line L1. Therefore, the center of gravity CG of the balancer 45 can be easily adjusted to be located on the second imaginary line L2 inclined at the inclination angle θ that is larger than 0° and smaller than 90°. Further, in this embodiment, the balancer 45 has such a shape that two portions of the balancer 45 on the opposite sides of an imaginary plane that contains the rotation center axis RX and the eccentric axis EX have different volumes from each other. This further facilitates adjusting the position of the center of gravity CG of the balancer 45 to a position on the second imaginary line L2 inclined at inclination angle θ is larger than 0° and smaller than 90.

Referring to FIG. 4, as described above, in this embodiment, the balancer 45 has the projection 83 protruding from the base 80 in the direction along (substantially parallel to) the rotation center axis RX. Thus, the weight of the balancer 45 is increased by the weight of the projection 83, so that the centrifugal force generated by rotation of the balancer 45 is increased compared with a balancer not having the projection 83. Therefore, the resistance generated between the tool accessory 100 and a workpiece during processing of the workpiece can be more effectively reduced. Further, the weight of the balancer 45 is increased by providing the projection 83, so that the size of the balancer 45 need not be increased in the radial direction in order to increase the weight of the balancer 45. In other words, provision of the projection 83 increases the weight of the balancer 45 without increasing the size of the balancer 45 in the radial direction, so that size increase of the balancer 45 in the radial direction can be avoided.

Further, by providing the balancer 45 of this embodiment, a space within the housing 11 that faces the side face of the base 80 of the balancer 45 can be effectively utilized to accommodate the projection 83. In this embodiment, the projection 83 protrudes from the side face of the base 80 in the same direction as the extending direction of the eccentric shaft 40, and a space around the outer periphery of the bearing 52 fitted onto the eccentric shaft 40 is effectively utilized to accommodate the projection 83 without becoming a dead space.

Referring to FIG. 7, in this embodiment, the projection 83 is formed on the outer edge part 82 that is farthest from the rotation center axis RX in the base 80 in the radial direction, which is orthogonal to the rotation center axis RX. In this embodiment, the outer edge part 82 has a circular arc shape. Owing to such a configuration, the distance between the center of gravity CG of the balancer 45 and the rotation center axis RX can be easily increased, and thus the centrifugal force generated by rotation of the balancer 45 can be easily increased. Therefore, increase of vibration of the power tool 10 during processing of the workpiece can be more effectively inhibited. In other embodiments, the projection 83 need not be formed on the outer edge part 82, but may be formed closer to the outer edge part 82 than to the rotation center axis RX. Even with this structure, due to the weight of the projection 83, the center of gravity CG of the balancer 45 can be easily set at a position spaced apart from the rotation center axis RX, and the centrifugal force generated by rotation of the balancer 45 can be easily increased.

With the power tool 10 according to this embodiment, as described above, the position of the center of gravity CG of the balancer 45 is set such that the centrifugal force is generated in a direction to cancel the influence of the resistance generated between the tool accessory 100 and a workpiece during processing of the workpiece. Therefore, vibration of the power tool 10 is inhibited from being increased due to the resistance generated between the tool accessory 100 and the workpiece during processing of the workpiece.

Other Embodiments

The present disclosure is not limited to any of the technical features of the above embodiment described with reference to the drawings and other embodiments described in the embodiment described with reference to the drawings. For example, the technical features of the above embodiment may be modified as follows. Like the embodiments described above, the following modified embodiments are also regarded as examples for practicing the present teachings.

The balancer 45 need not have a fan-like shape (a sectoral shape), but may have, for example, a completely circular shape or an elliptic shape, or a generally triangular shape, when viewed along the rotation center axis RX. As described in the above embodiment, it is sufficient for the balancer 45 as long as the center of gravity CG is located on the second imaginary line L2 that is inclined at the inclination angle θ that is larger than 0° and smaller than 90°. Further, the balancer 45 may be configured, for example, to have a spherical or curved surface as a whole such that the thickness gradually increases toward the circular arc outer edge part 82.

The motor 31 may be arranged, for example, such that the rotation center axis RX extends substantially in parallel to the driving axis DX. In this case, the motor 31 may be arranged above the spindle 60, or may be arranged such that the rotation center axis RX is offset (displaced) from the driving axis DX. Alternatively, the motor 31 may be arranged such that the rotation center axis RX obliquely crosses the driving axis DX, instead of being substantially orthogonal to the driving axis DX.

DESCRIPTION OF THE NUMERALS

10: power tool, 11: housing, 20: power supply part, 22: power cord, 25: control circuit, 27: operation part, 28: speed change operation part, 30: rotary drive mechanism, 31: motor, 32: rotary shaft, 32*s*: cut-out wall surface, 33: rotor, 34: stator, 36: fan, 37: front bearing part, 38: rear bearing part, 40: eccentric shaft, 45: balancer, 50: motion converting mechanism, 52: bearing, 53: connection arm, 54: annular part, 55: pair of arm parts, 60: spindle, 62: tool mounting part, 63: lower end opening, 65: projection, 66: clamping member, 67: coil spring, 68: lever, 70: spindle holding mechanism, 73: first bearing part, 75: elastic member, 76: second bearing part, 80: base, 81: insertion hole, 82: outer edge part, 83: projection, 84: round corner part, 85: cut-out part, 86: washer, 87: snap ring, 100: tool accessory, 102: through hole, 103: fitting hole, 110: fastening shaft, 112: head, CF: arrow showing a direction in which the centrifugal force acts, CG: center of gravity, DX: driving axis, EF: centrifugal force of the eccentric shaft, EX: eccentric axis, GA: region, L1: first imaginary line, L2: second imaginary line, OD: oscillating direction, RD: rotating direction, RE, REa: arrow showing a direction in which the resistance acts, RX: rotation center axis, SA: oscillation range, VL: imaginary perpendicular line

The invention claimed is:

1. A power tool configured to process a workpiece by driving a tool accessory in an oscillating manner, the power tool comprising:

a motor having a rotary shaft that is rotationally driven in one direction;

an eccentric shaft that extends from one end of the rotary shaft and is configured to be rotated around a rotation center axis of the rotary shaft, at a position that is eccentric from the rotation center axis of the rotary shaft in a radial direction orthogonal to the rotation center axis, by rotation of the rotary shaft;

a motion converting mechanism that is configured to connect the tool accessory and the eccentric shaft and convert one revolution of the eccentric shaft to one reciprocating oscillation of the tool accessory; and a balancer that is mounted onto an outer periphery of the rotary shaft and configured to rotate together with the rotary shaft, wherein:

when viewed along the rotation center axis, (1) a first imaginary line passes the rotation center axis and an eccentric axis, which is a center axis of the eccentric shaft, (2) an imaginary perpendicular line crosses perpendicularly to the first imaginary line and passes through the rotation center axis, (3) a center of gravity of the balancer is located in a region on a side opposite to the eccentric axis across the imaginary perpendicular line, (4) a second imaginary line passes the rotation center axis and the center of gravity of the balancer, and (5) the second imaginary line is inclined at an inclination angle larger than 0° and smaller than 90° in a direction opposite to a rotating direction of the rotary shaft relative to the first imaginary line.

2. The power tool as defined in claim 1, wherein the balancer has an asymmetrical shape to the first imaginary line when viewed along the rotation center axis.

3. The power tool as defined in claim 1, wherein the balancer has a base through which the rotary shaft is inserted in a thickness direction of the base, and a projection protruding from a side face of the base in a direction parallel to the rotation center axis.

4. The power tool as defined in claim 3, wherein the projection is provided on an outer edge part that is farthest from the rotation center axis in the radial direction in the base, or in a position closer to the outer edge part than to the rotation center axis in the radial direction.

5. The power tool as defined in claim 1, wherein the inclination angle is larger than 10° and smaller than 60°.

6. The power tool as defined in claim 1, further comprising:

a housing that houses the motor, the eccentric shaft, the motion converting mechanism and the balancer, wherein:

the motion converting mechanism includes:

a spindle that has a tool mounting part for mounting the tool accessory at an end and is configured to oscillate the tool accessory by reciprocatingly rotating in a circumferential direction; and a connection arm that has a first end fixed to the spindle and a second end connected to the eccentric shaft and is configured to be reciprocatingly rotated around the spindle by rotation of the eccentric shaft, the spindle is supported to be reciprocatingly rotatable in the circumferential direction by a first bearing part provided within the housing and a second bearing part provided between the first bearing part and the tool mounting part within the housing, and the first bearing part is held by the housing via an elastic member.

7. The power tool as defined in claim 6, wherein the second bearing part comprises a ball bearing.

8. The power tool as defined in claim 1, wherein the motor is arranged such that the rotation center axis crosses an oscillation axis of the tool accessory.

9. The power tool as defined in claim 2, wherein the balancer has a base through which the rotary shaft is inserted in a thickness direction of the base, and a projection protruding from a side face of the base in a direction parallel to the rotation center axis.

10. The power tool as defined in claim 9, wherein the projection is provided on an outer edge part that is farthest from the rotation center axis in the radial direction in the base, or in a position closer to the outer edge part than to the rotation center axis in the radial direction.

11. The power tool as defined in claim 9, wherein the inclination angle is larger than 10° and smaller than 60°.

12. The power tool as defined in claim 10, wherein the inclination angle is larger than 10° and smaller than 60°.

13. The power tool as defined in claim 2, wherein the inclination angle is larger than 10° and smaller than 60°.

14. The power tool as defined in claim 3, wherein the inclination angle is larger than 10° and smaller than 60°.

15. The power tool as defined in claim 4, wherein the inclination angle is larger than 10° and smaller than 60°.

16. The power tool as defined in claim 4, further comprising:

a housing that houses the motor, the eccentric shaft, the motion converting mechanism and the balancer, wherein:

the motion converting mechanism includes:

a spindle that has a tool mounting part for mounting the tool accessory at an end and is configured to oscillate the tool accessory by reciprocatingly rotating in a circumferential direction, and a connection arm that has a first end fixed to the spindle and a second end connected to the eccentric shaft and is configured to be reciprocatingly rotated around the spindle by rotation of the eccentric shaft, the spindle is supported to be reciprocatingly rotatable in the circumferential direction by a first bearing part provided within the housing and a second bearing part provided between the first bearing part and the tool mounting part within the housing, and the first bearing part is held by the housing via an elastic member.

17. The power tool as defined in claim 16, wherein the second bearing part comprises a ball bearing.

18. The power tool as defined in claim 15, further comprising:

a housing that houses the motor, the eccentric shaft, the motion converting mechanism and the balancer, wherein:

the motion converting mechanism includes:

a spindle that has a tool mounting part for mounting the tool accessory at an end and is configured to oscillate the tool accessory by reciprocatingly rotating in a circumferential direction; and a connection arm that has a first end fixed to the spindle and a second end connected to the eccentric shaft and is configured to be reciprocatingly rotated around the spindle by rotation of the eccentric shaft, the spindle is supported to be reciprocatingly rotatable in the circumferential direction by a first bearing part provided within the housing and a second bearing part provided between the first bearing part and the tool mounting part within the housing, and the first bearing part is held by the housing via an elastic member.

19. The power tool as defined in claim 18, wherein the second bearing part comprises a ball bearing.

* * * * *